United States Patent [19]

Zoeckler et al.

[11] Patent Number: 4,810,761
[45] Date of Patent: Mar. 7, 1989

[54] ETHYLENE POLYMERIZATION CATALYST

[75] Inventors: Mary T. Zoeckler, Frenchtown; Frederick J. Karol, Belle Mead, both of N.J.

[73] Assignee: Union Carbide Corporation, Danbury, Conn.

[21] Appl. No.: 32,359

[22] Filed: Mar. 31, 1987

[51] Int. Cl.$^4$ ............... C08F 4/64; C08F 10/02
[52] U.S. Cl. ................... 526/124; 526/125; 526/129; 526/352
[58] Field of Search ................ 526/124, 125

[56] References Cited

U.S. PATENT DOCUMENTS

| 3,143,537 | 8/1964 | Hagemezer et al. | 526/125 |
|---|---|---|---|
| 4,314,911 | 2/1982 | Gannini et al. | 526/122 |
| 4,495,338 | 1/1985 | Mayr et al. | 526/125 |
| 4,508,842 | 4/1985 | Beran et al. | 502/112 |
| 4,544,717 | 10/1985 | Mayr et al. | 526/125 |
| 4,559,318 | 12/1985 | Smith et al. | 502/110 |
| 4,579,833 | 4/1986 | Collomb et al. | 502/104 |

FOREIGN PATENT DOCUMENTS 2051094 1/1981 United Kingdom .

Primary Examiner—Edward J. Smith
Attorney, Agent, or Firm—Saul R. Bresch

[57] ABSTRACT

A vanadium catalyst composition comprising:
 (i) the reaction product of a vanadium trihalide wherein the halogen is chlorine, bromine, or iodine, or mixtures thereof, and an electron donor, which is a liquid, organic Lewis base in which the vanadium trihalide is soluble;
 (ii) a silica support onto which component (i) is impregnated;
 (iii) a salt admixed with the silica support, the cation of said salt being selected from the group consisting of Groups I and II of the Periodic Chart of the Atoms;
 (v) a halocarbon promoter; and
 (v) a hydrocarbyl aluminum cocatalyst.

2 Claims, No Drawings

ETHYLENE POLYMERIZATION CATALYST

TECHNICAL FIELD

This invention relates to a vanadium catalyst useful in ethylene polymerization.

BACKGROUND ART

A number of vanadium catalysts have been described in the literature based on species such as $VCl_4$, $VCl_3$, $VOCl_3$, and vanadyl tris-acetylacetonate. Impregnated on or chemically anchored to supports such as silica, these catalysts provide polyethylene with a broad molecular weight distribution and certain desirable properties. However, these catalyst systems are plagued by several problems, among them, low activity. Particularly in a gas phase process, high activity and hence low catalyst residues, obviating the need for removal, are desired.

Recently vanadium catalysts have come to the fore in polyethylene production because of the discovery of a particular catalyst composition, which is singularly effective in gas phase processes. The advantages of this catalyst composition are superior hydrogen response thus achieving very low levels of unsaturation in the polymer; a high degree of productivity resulting in very low catalyst residues; and the production of polyethylenes having a relatively broad molecular weight distribution and a wide melt index range. Further, they permit the utilization of a broad range of alpha-olefin comonomers, which enables the production of a wide range of densities; and they provide polymers having high bulk densities and readily fluidizable particle sizes low in fines, substantially free of agglomeration.

The particular catalyst composition referred to comprises (i) the reaction product of a vanadium trihalide and an electron donor and a modifier impregnated onto a silica support; (ii) a halocarbon promoter; and (iii) a hydrocarbyl aluminum cocatalyst. The catalyst composition can be prepared as follows: the vanadium trihalide is first dissolved in the electron donor at a temperature in the range of about 20° C. to below the boiling point of the electron donor for about 2 to about 6 hours. Silica is then added as a dry powder or as a slurry in the electron donor or an inert solvent whereupon the silica becomes impregnated with the vanadium trihalide/electron donor reaction product. The liguid is then removed by drying at less than 100° C. for about 3 to about 6 hours. The modifier, dissolved in an inert solvent, is subseguently mixed with the impregnated carrier, and the liguid is removed by drying at a temperature of less than about 70° C. for about 2 to about 4 hours. The halocarbon promoter and the hydrocarbyl aluminum cocatalyst are added to the supported catalyst either before and/or during polymerization.

Since its introduction into commerce, the art has sought to optimize this, catalyst composition particularly with regard to its polymerization activity.

DISCLOSURE OF THE INVENTION

An object of the invention, therefore, is to enhance the polymerization activity of this vanadium catalyst composition. Other objects and advantages will become apparent hereinafter.

According to the present invention, then, the vanadium catalyst composition has been discovered having increased polymerization activity. The enhanced composition comprises:

(i) the reaction product of a vanadium trihalide wherein the halogen is chlorine, bromine, or iodine, or mixtures thereof, and an electron donor, which is a liguid, organic Lewis base in which the vanadium trihalide is soluble, (ii) a silica support onto which component (i) is impregnated;

(iii) a salt admixed with the silica support, the cation of said salt being selected from the group consisting of Groups I and II of the Periodic Chart of the Atoms;

(iv) a halocarbon promoter; and (v) a hydrocarbyl aluminum cocatalyst.

Optionally, the following component is included in the above composition and impregnated onto the silica support:

(vi) a modifier having the formula $MX_a$ wherein M is boron or $AlR_{(3-a)}$; each R is an alkyl radical having 1 to 14 carbon atoms and is alike or different; X is chlorine, bromine, or iodine; and a is 0, 1, or 2 except that when M is boron, a is 3.

DETAILED DESCRIPTION

The Periodic Chart of the Atoms referred to above is the 1969 Edition published by Sargent-Welch Scientific Company, Skokie, Ill., and is incorporated by reference herein.

As noted, the trihalide portion of the vanadium trihalide is either chlorine, bromine, or iodine, or mixtures thereof.

The electron donor is a liguid, organic Lewis base in which the vanadium trihalide is soluble. It can be selected from the group consisting of alkyl esters of aliphatic and aromatic carboxylic acids, aliphatic ketones, aliphatic amines, aliphatic alcohols, alkyl and cycloalkyl ethers, and mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of vanadium trihalide and electron donor, the reaction product finally contains about 1 to about 20 moles of electron donor per mole of vanadium trihalide and preferably about 1 to about 10 moles of electron donor per mole of vanadium trihalide. About 3 moles of electron donor per mole of vanadium trihalide has been found to be most preferable.

The silica support is a solid, particulate porous material essentially inert to the polymerization. It is used as a dry powder having an average particle size of about 10 to about 250 microns and preferably about 30 to about 100 microns; a surface area of at least about 3 sguare meters per gram and preferably about 50 sguare meters per gram; and a pore size of at least about 80 Angstroms and preferably at least about 100 Angstroms. Generally, the amount of support used is that which will provide about 0.05 to about 0.5 millimole of vanadium trihalide per gram of support and preferably about 0.2 to about 0.3 millimole of vanadium trihalide per gram of support.

Any salt having a cation selected from the group consisting of Group I and II of the Periodic Chart of the Atoms can be used, particularly the inorganic salts. Preferred salts are alkali metal or alkaline earth metal salts of sulfates, carbonates, and chlorides. Preferred cations are sodium, potassium, magnesium and calcium. Mixtures of salts can be used if desired. The salt of choice is calcium carbonate.

The amount of salt can be in the range of about 1.5 to about 90 percent by weight based on the weight of the silica support exclusive of impregnated components, and is preferably in the range of about 2 to about 10 percent by weight. The salt can be dry mixed with the silica support prior to activation or the salt and the silica support can be activated separately and slurried in an electron donor or other inert solvent with silica prior to th addition of the reaction product of vanadium trihalide and the same electron donor. Either of these routes is more effective than dry mixing the salt with the silica supported vanadium catalyst. In any case, the salts used in the preparation of subject catalyst should be essentially free of water.

The halocarbon promoter can have the following formula:

$$R_xCX_{(4-x)}$$

wherein
R = hydrogen or an unsubstituted or halogen substituted alkyl radical having 1 to 6 carbon atoms;
X = a halogen; and
x = 0, 1, or 2.

Preferred promoters include fluoro-, chloro-, and bromo substituted methane or ethane having at least 2 halogen atoms attached to a carbon atom, e.g., methylene dichloride, 1,1,1 trichloroethane, chloroform, $CBr_4$, $CFCl_3$, hexachloroethane, $CH_3CCl_3$, and $CF_2ClCCl_3$. The first three mentioned promoters are especially preferred. About 0.1 to about 10 moles, and preferably about 0.2 to about 2 moles, of promoter can be used per mole of cocatalyst.

The hydrocarbyl aluminum cocatalyst can be represented by the formula $R_3Al$ wherein each R is an alkyl radical; each R can be alike or different; and each R has 1 to 14 carbon atoms, and preferably 2 to 8 carbon atoms. Further, each alkyl radical can be a straight or branched chain. Examples of suitable radicals are: methyl, ethyl, propyl, isopropyl, butyl, isobutyl, tert butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, and dodecyl.

Examples of suitable hydrocarbyl aluminum compounds are as follows: triisobutylaluminum, trihexylaluminum, di isobutylhexylaluminum, isobutyl dihexylaluminum, trimethylaluminum, triethylaluminum, tripropylaluminum, triisopropylaluminum, tri-n-butylaluminum, trioctyaluminum, tridecylaluminum, tridodecylaluminum, tribenzylaluminum, triphenylaluminum, trinaphthylaluminum, and tritolylaluminum. The preferred hydrocarbyl aluminums are triethylaluminum, triisobutylaluminum, and trihexylaluminum.

The cocatalyst and promoter can be added to the supported vanadium complex either before or during the polymerization reaction. They can be added together or separately, simultaneously or seguentially. The cocatalyst and promoter are preferably added separately as solutions in an inert solvent, such as isopentane, to the polymerization reaction at the same time as the flow of the ethylene is initiated. The cocatalyst is necessary to obtain any significant polymerization. The promoter, on the other hand, can be considered a preferred option. About 5 to about 500 moles, and preferably about 10 to about 40 moles, of cocatalyst can be used per mole of vanadium catalyst, i.e., the reaction product of the vanadium trihalide and the electron donor.

The formula of the modifier is $MX_a$ wherein M is boron or $AlR_{(3-a)}$; each R is an alkyl radical having 1 to 14 carbon atoms and is alike or different; X is chlorine, bromine, or iodine, or mixtures thereof; and a is 0, 1, or 2 except that when M is boron, a is 3. Preferred modifiers include alkylaluminum mono- and di-chlorides wherein each alkyl radical has 1 to 6 carbon atoms, and boron trichloride. A particularly preferred modifier is diethyl aluminum chloride. About 0.1 to about 10 moles, and preferably about 0.2 to about 2.5 moles, of modifier are used per mole of electron donor. When the modifier is used it is considered to be part of the vanadium trichloride/electron donor complex.

The supported catalyst is typically prepared as follows: silica gel is activated at a temperature in the range of about 250° C. to about 800 ° C. under a dry, inert gas such as nitrogen for about 8 to about 16 hours to give a support essentially free of adsorbed water and containing less than about 0.7 millimole per gram of silica of surface hydroxy groups. Commercially available powdered "anhydrous" salts are used. The salt is activated at a temperature in the range of about 200° C. to about 400° C. under a dry, inert gas such as nitrogen for about 8 to about 16 hours. The silica and salt are slurried in freshly distilled tetrahydrofuran (THF), under nitrogen. An amount of $VCl_3(THF)_3$ is added to give a loading of about 0.2 to about 0.35 millimole of vanadium per gram of support. The mixture is stirred for about 20 to about 40 minutes, then excess THF is removed to give a free flowing powder. If diethylaluminum chloride (DEAC) modification is desired, the dry catalyst is slurried in dry, deoxygenated hexane. DEAC is added, and, after stirring for about 20 to about 30 minutes, the hexane is removed to give a free-flowing powder.

Rather than activating the salt and silica separately, as above, the two components can be dry mixed and activated at a temperature below the decomposition temperature of the particular salt.

Alternatively, the salt can be activated and added to the supported catalyst. The catalyst is slurried in hexane with the salt under nitrogen. The mixture is stirred for about 20 to about 30 minutes, and the hexane is removed to give a free flowing powder. This method is generally less effective than the above two technigues insofar as increasing polymerization activity is concerned.

The ethylene polymerization can be conducted in the gas phase or liguid phase using conventional technigues such as fluidized bed, slurry, or solution processes. A continuous, fluidized bed process is preferred. Using this fluidized bed process, the vanadium complex, the cocatalyst, the promoter, the ethylene monomer, and any comonomers are continuously fed into the reactor and polyethylene product is continuously removed. The density of the ethylene copolymer produced may be varied over a wide range depending upon the amount of alpha-olefin comonomer added and upon the particular comonomer employed. The greater the mole percent of alpha-olefin, the lower the density.

The fluidized bed polymerization is conducted at a temperature below the sintering temperature of the product. The operating temperature is generally in the range of about 10° C. to about 115° C. Preferred operating temperatures will vary depending upon the density desired. High density polyethylenes of greater than about 0.94 grams per cubic centimeter (g/cc) are produced at operating temperatures of about 85° C. to about 115° C., and preferably about 90° C. to about 100° C. Low density polyethylenes ranging in density from about 0.91 to about 0.94 g/cc are preferably produced at an operating temperature of about 75° C. to about 90° C. Very low density polyethylenes of less than about 0.91 g/cc are preferably produced at an operating temperature of about 10° C. to about 80° C. In the case of very low density polyethylenes, it is necessary to dilute the reaction mixture with a large guantity of diluent gas in order to prevent the formation of polymer agglomerates and sustain polymerization on a continuous basis.

The fluidized bed reactor is typically operated at pressures of up to about 1,000, and preferably about 50 to about 350, psig.

A chain transfer agent, such as hydrogen, can be used to terminate the polymer chain. Usually the ratio of hydrogen to ethylene will vary between about 0.001 to about 2.0 moles of hydrogen per mole of ethylene.

In the past, improvements in polymerization activity have been achieved through the use of halocarbon promoters or by pretreatment with modifiers such as haloaluminum alkyls. This invention provides a new class of activity enhancers, namely, the Groups I and II salts. Added to the catalyst support, these salts result in improved activity while preserving the desired high hydrogen response and broad molecular weight distribution. The materials are readily available, easily handled, and have the added advantage of being neutral salts. They, therefore, do not contribute to reactor and post reactor corrosion problems associated with the use of aluminum alkyls and halocarbons.

It has been noted that the most preferred salt is calcium carbonate. Calcium is the preferred cation; carbonate is the preferred anion. The optimum amount of salt depends on each salt, e.g., low levels of calcium carbonate, but high levels of calcium sulfate, offer the most significant activity boost among the salts tested.

Modifiers such as diethylaluminum chloride are used in vanadium catalyst systems to improve hydrogen response, increase bulk density, and decrease fines. Calcium carbonate can replace these modifiers at low levels and hydrogen response and bulk density will be comparable while the activity is significantly improved. At higher levels, modifier treatment results in higher activity and hydrogen response. In this case, high levels of calcium carbonate are not eguivalent to high modifier levels. Used in conjunction with a modifier, however, calcium carbonate offers activity enhancement.

Subject catalyst, except for the salt, and its preparation are closely related to the catalyst described in U.S. Pat. No. 4,508,842 issued on Apr. 2, 1985, which is incorporated by reference herein.

The invention is illustrated by the following examples:

EXAMPLES 1 TO 24

Powdered calcium carbonate is activated at 200° C. nitrogen for 12 hours. VCl$_3$·3THF solution is added to a slurry of calcium carbonate and silica in THF and then dried at 45° C. until free-flowing. DEAC treatment, when used, is accomplished as discussed above.

Powdered Na, K, Mg, and Ca sulfates and chlorides are treated in the same manner as calcium carbonate.

The catalyst, a cocatalyst, and a promoter are slurried in 480 milliliters of hexane and the mixture is introduced into a reactor along with ethylene and 1 or 5 pounds per sguare inch of hydrogen to give a total pressure of 160 pounds per sguare inch gauge. An amount of catalyst sufficient to give a charge of 0.03 or 0.06 millimole of vanadium is used. 20 milliliters of 1-hexene are also introduced into the reactor in each example except example 13. Forty eguivalents each of cocatalyst and promoter are used per eguivalent of vanadium. The temperature in the reactor is maintained at 85° C. and the resieence time in the reactor is 30 minutes.

Variables and results are set forth in the Table.

Notes with respect to the Table:
1. Wt. % salt=the percent by weight of salt based on the weight of the silica support exclusive of impregnated components.
2. mmol=millimole.
3. TIBA=triisobutylaluminum.
4. TEAL=triethylaluminum.
5. psi=pounds per sguare inch.
6. Relative Activity=activity of catalyst on salt treated (doped) silica/activity of VCl$_3$·3THF on silica (not doped).
7. The activity of the catalyst is measured in grams of polyethylene per millimole of vanadium per hour per 100 psi of ethylene.
8. MI=Melt index: ASTM D 1238, Condition E. Measured at 190° C. and reported as grams per 10 minutes.
9. MFR=Melt flow ratio: Ratio of Flow Index to Melt Index. FI=Flow index: ASTM D 1238, Condition F. Measured at 10 times the weight used in the melt index test above.
10 Bulk density: ASTM D 1895, Method B. The resin is poured via a ⅛-inch diameter funnel into a 400 milliliter graduated cylinder to the 400 milliliter line without shaking the cylinder, and weighed by difference. Density values are reported as kilograms per cubic meter (kg/m$^3$).
11. DEAC=diethylaluminum chloride.
12. Polymer density: ASTM D-1505 procedure is followed for polymers having a density of less than 0.940 gram per cubic centimeter and a modified procedure is used for polymers having a density egual to or greater than 0.940 gram per cubic centimeter. For the low density polymers, a plague is made and conditioned for one hour at 100° C. to approach eguilibrium crystallinity. For the high density polymers, the plague is conditioned for one hour at 120° C. to approach eguilibrium crystallinity, and is then guickly cooled to room temperature. Measurement for density is then made in a density gradient column and density values are reported as grams per cubic centimeter.

TABLE

| Example | Salt | Wt. % Salt | DEAC/V (molar ratio) | Cocatalyst | Promoter | H$_2$ (psi) | Relative Activity | Activity | MI | MFR | Bulk Density (kg/m$^3$) | Polymer Density (g/cc) |
|---|---|---|---|---|---|---|---|---|---|---|---|---|
| 1 | none | 0 | 0 | TIBA | CHCl$_3$ | 5 | 1.0 | 960 | 0.62 | 90 | 270 | 0.9596 |
| 2 | CaCO$_3$ | 1.7 | 0 | TIBA | CHCl$_3$ | 5 | 3.3 | 3160 | 1.4 | 110 | 230 | 0.9650 |
| 3 | CaCO$_3$ | 2.0 | 0 | TEAL | CFCl$_3$ | 5 | 2.6 | 2540 | 2.8 | 120 | 220 | 0.9500 |
| 4 | CaCO$_3$ | 5.0 | 0 | TIBA | CHCl$_3$ | 5 | 2.6 | 2500 | 0.27 | 140 | 250 | 0.9521 |
| 5 | CaSO$_4$ | 5.0 | 0 | TIBA | CHCl$_3$ | 5 | 1.6 | 1530 | 0.38 | 68 | 280 | 0.9549 |
| 6 | CaSO$_4$ | 90 | 0 | TIBA | CHCl$_3$ | 5 | 2.6 | 2450 | 29 | 77 | 270 | 0.9560 |
| 7 | CaCl$_2$ | 9.0 | 0 | TIBA | CHCl$_3$ | 5 | 1.9 | 1810 | 1.4 | 91 | 320 | 0.9515 |
| 8 | Na$_2$CO$_3$ | 3.8 | 0 | TIBA | CFCl$_3$ | 1 | 2.3 | 2250 | 0.16 | — | 270 | 0.9524 |
| 9 | MgCO$_3$ | 1.9 | 0 | TIBA | CFCl$_3$ | 1 | 2.3 | 2160 | 0.94 | 109 | 240 | 0.9538 |
| 10 | MgCO$_3$ | 1.9 | 0 | TEAL | CFCl$_3$ | 5 | 1.8 | 1710 | 31 | 33 | 220 | 0.9558 |
| 11 | Na$_2$SO$_4$ | 90 | 0 | TIBA | CHCl$_3$ | 5 | 1.4 | 1370 | 0.69 | 61 | 170 | 0.9557 |
| 12 | MgSO$_4$ | 90 | 0 | TIBA | CHCl$_3$ | 5 | 1.3 | 1260 | — | — | 240 | 0.9573 |
| 13 | NaCl | 37 | 0 | TIBA | CHCl$_3$ | 5 | 1.4 | 1310 | 2.4 | 81 | 300 | 0.9549 |
| 14 | MgCl$_2$ | 4.8 | 0 | TIBA | CHCl$_3$ | 5 | 1.6 | 1510 | 0.97 | 75 | 260 | 0.9561 |
| 15 | none | 0 | 0 | TIBA | CHCl$_3$ | 5 | 1.0 | 960 | 0.62 | 90 | 270 | 0.9596 |
| 16 | CaCO$_3$ | 1.7 | 0 | TIBA | CHCl$_3$ | 5 | 3.3 | 3160 | 1.4 | 110 | 230 | 0.9650 |
| 17 | none | 0 | 1.2 | TIBA | CHCl$_3$ | 5 | 1.1 | 1020 | 0.19 | 101 | 300 | 0.9520 |
| 18 | CaCO$_3$ | 1.7 | 1.2 | TIBA | CHCl$_3$ | 5 | 3.3 | 3180 | 1.99 | 106 | 250 | 0.9564 |
| 19 | none | 0 | 4.4 | TIBA | CHCl$_3$ | 5 | 4.2 | 4030 | 80 | — | 260 | 0.9534 |
| 20 | CaCO$_3$ | 1.7 | 4.4 | TIBA | CHCl$_3$ | 5 | 5.6 | 5330 | 41 | 68 | 240 | 0.9543 |
| 21 | CaCl$_2$ | 9.0 | 4.5 | TIBA | CHCl$_3$ | 5 | 5.0 | 4770 | 6.8 | 66 | 270 | 0.9524 |

We claim:

1. A process for the polymerization or co-polymerization of ethylene comprising passing ethylene with or without an alpha-olefin comonomer into contact with a vanadium catalyst under polymerization conditions, the catalyst comprising:
   (i) the reaction product of a vanadium trihalide wherein the halogen is chlorine, bromine, or iodine, or mixtures thereof, and an electron donor, which is a liquid organic Lewis base in which the vanadium trihalide is soluble;
   (ii) a modifier, BX$_3$ or a compund having the formula AlR$_{(3-a)}$X$_a$ wherein each R is an alkyl radical having 1 to 14 carbon atoms and is alike or different; X is chlorine, bromine, or iodine, or mixtures thereof; and a is 0, 1, or 2;
   (iii) a silican support into which components (i) and (ii) are impregnated;
   (iv) a salt admixed with the silica support, the cation of said salt being selected from Groups I and II of the Periodic Chart of the Atoms and the anion of said salt being a carbonate or a sulfate;
   (v) a halocarbon promoter; and
   (vi) a hydrocarbyl aluminum cocatalyst, wherein the molar ratio of (a) electron donor to vanadium trihalide is about 1:1 to about 20:1; (b) modifier to electron donor is about 0.1:1 to about 10:1; (c) cocatalyst to component (i) is about 5:1 to 500:1; and (d) promoter to cocatalyst is about 0.1:1 to about 10:1.

2. The process defined in claim 1 wherein the Lewis base is selected from the group consisting of alkyl esters of aliphatic and aromatic carboxylic acids, aliphatic ketones, aliphatic amines, aliphatic alcohols, alkyl and cycloalkyl ethers, and mixtures thereof.

* * * * *

UNITED STATES PATENT AND TRADEMARK OFFICE
CERTIFICATE OF CORRECTION

PATENT NO. : 4,810,761

DATED : March 7, 1989

INVENTOR(S) : M.T. Zoeckler et al

It is certified that error appears in the above-identified patent and that said Letters Patent is hereby corrected as shown below:

Column 7, line 35, the spelling of the word "compound" is corrected, and at line 40, "silican" is changed to -- silica --.

Signed and Sealed this

Twenty-second Day of August, 1989

Attest:

DONALD J. QUIGG

Attesting Officer

Commissioner of Patents and Trademarks